(12) United States Patent
Von Planta et al.

(10) Patent No.: US 6,170,138 B1
(45) Date of Patent: Jan. 9, 2001

(54) CAPACITOR WITH COLD-FLOW-EXTRUDED ELECTRODES

(75) Inventors: J. Andrea Von Planta, Oetwil; Bernhard Hug, Bern, both of (CH)

(73) Assignee: Comet Technik AG, Liebefeld (CH)

( * ) Notice: Under 35 U.S.C. 154(b), the term of this patent shall be extended for 0 days.

(21) Appl. No.: 09/036,300

(22) Filed: Mar. 6, 1998

(30) Foreign Application Priority Data

Mar. 8, 1997 (CH) .................................................. 0544/97

(51) Int. Cl.[7] ...................................................... H01G 7/00
(52) U.S. Cl. .................... 29/25.41; 29/25.42; 29/423; 361/271; 361/278; 361/279
(58) Field of Search ............... 29/25.41, 25.42, 29/605, 424, 423; 361/271, 272, 321.2, 278, 279, 296, 298

(56) References Cited

U.S. PATENT DOCUMENTS

| | | | |
|---|---|---|---|
| 3,200,630 | * 8/1965 | Wilson | 72/254 |
| 3,600,787 | * 8/1971 | Lindsay | 29/25.41 |
| 3,611,075 | * 10/1971 | Lindsay | 317/245 |
| 3,618,186 | * 11/1971 | Krefft | 29/25.41 |
| 3,619,877 | * 11/1971 | Hanson | 29/25.41 |
| 3,675,288 | * 7/1972 | Tronser | 29/25.41 |
| 3,949,280 | * 4/1976 | Odagiri et al. | 29/25.41 |
| 4,002,957 | * 1/1977 | Weisbrod | 317/245 |
| 4,035,697 | * 7/1977 | Arnold, Jr. | 361/289 |
| 4,177,495 | * 12/1979 | Perret | 361/279 |
| 4,394,713 | * 7/1983 | Yoshida | 361/433 |
| 4,749,587 | * 6/1988 | Bergmann | 427/37 |
| 5,134,039 | * 7/1992 | Alexander et al. | 428/614 |
| 5,572,548 | * 11/1996 | Pirez et al. | 375/260 |

FOREIGN PATENT DOCUMENTS

| | | | |
|---|---|---|---|
| 1101579 | * 6/1954 | (FR) . | |
| 5-326324 | * 7/1992 | (JP) | 29/25.41 |

OTHER PUBLICATIONS

I.V. Shostak; "Frequency Characteristics of Vacuum Capacitors"; *Radio Engineering*; Feb. 2, 1968; vol. 24, No. 10, pp. 105–108.*

* cited by examiner

*Primary Examiner*—Lee Young
*Assistant Examiner*—Minh Trinh
(74) *Attorney, Agent, or Firm*—Merchant & Gould P.C.

(57) ABSTRACT

A capacitor is described, in particular a vacuum capacitor, comprising two electrodes (1, 1'), at least one insulator (5), and means for fastening (4, 4').

A process is proposed according to which the two electrodes (1, 1') are each produced as one piece of an electrode material through a cold-flow extrusion process. The electrodes so produced are distinguished by a high surface quality. The result of this, in the capacitors produced from such electrodes, is high quality-factors, low temperature coefficients, a high current-carrying capacity, and an excellent dielectric strength, as well as a compact structure with a simultaneous reduction in the number of components required.

Capacitors of this type, in particular vacuum capacitors, find application in HF technology for fixed and variable capacitance values.

3 Claims, 4 Drawing Sheets

CAPACITOR WITH COLD-FLOW-EXTRUDED ELECTRODES

The invention concerns a process for production of a capacitor, in particular a vacuum capacitor, with cold-flow-extruded electrodes according to patent claim 1, and a capacitor according to patent claim 7.

Capacitors, in particular vacuum capacitors, for high-voltage ranges are known and, for example, find application in HF technology. The capacitor plates are generally each attached to a carrier part, this taking place, for example, through soldering. The two carrier parts are connected to the capacitor plates by means of an insulator, which is brought about through the same or a further soldering process. A rather expensive production method is required for this in order to meet the high demands with respect to the plate gap. Finally, the dimensional stability of the plate gap establishes the dielectric strength.

It is the task of the present invention to propose a process for production of a capacitor, in particular a vacuum capacitor, which process is simple to carry out and without problem meets the demands for dimensional stability in the plate gap. A further task of the present invention consists in proposing capacitors that are produced according to the process referred to.

According to the invention this task is accomplished with a process for a capacitor, in particular a vacuum capacitor, in which process each of the two electrode sets and the capacitor's holder for each set consist of a single piece, conforming to the wording of patent claim 1, and with a capacitor produced according to this process, conforming to the wording of patent claim 7.

The invention is explained in greater detail in the following with the aid of the drawings. They show:

FIG. 1 Schematic representation of a vacuum capacitor in outline

FIG. 2 Schematic representation of a first electrode

FIG. 3 Schematic representation of an insulator in sectional view

FIG. 4A–4B First implementation example of an electrode in plan and sectional view FIG. 4C First implementation example of a vacuum capacitor in sectional view FIG. 5A Second implementation example of a vacuum capacitor in outline FIG. 5B–5C Second implementation example of an electrode in plan and sectional view FIG. 6 Third implementation example of a variable vacuum capacitor in sectional view FIG. 1 shows a schematic representation of a vacuum capacitor in outline. A first electrode 1 and a second electrode 1' each show a first cylindrical part 2, 2', each of which continues on one side with a second cylindrical part 3, 3' with a slightly reduced diameter. On the other side of the cylindrical parts 2, 2', the electrodes each show a fastening element 4, 4', e.g. a fastening bolt. The two electrodes 1, 1' are connected in an insulated manner to a vacuum-sealed housing by means of an insulator 5. However, the insulator 5 can also be produced from several segmented parts consisting of different materials, which can be of interest for compensating voltages for temperature behavior.

FIG. 2 shows a schematic representation of a first electrode in sectional view, by aid of which the process for producing the same will be explained. The first cylindrical part 2 continues on one side with a second cylindrical part 3 with a slightly reduced diameter, which terminates at position 6. This termination serves to support an insulator (not represented), which is joined firmly and vacuum-tight to the insulator at the edge of position 6, or rather at the termination, in a soldering process. On the other side of the cylindrical part 2 a recess 7 can be recognized that serves the taking up of the fastening element, which is not depicted. The recess 7 is arranged in the center of the cylindrical part 2. Arranged on the side opposite that of the recess 7 are the "plates", or the electrode parts, of the capacitor, which electrode parts are formed as concentric cylinders 11–15. The gaps between the individual concentric cylinders 11–15 are essentially equal, and this with a very great precision, or dimensional stability, in order to guarantee the predetermined dielectric strength of the capacitor, or more precisely vacuum capacitor. It is essential that this dimensional stability remains ensured over the entire depth of the concentric cylinder. The upper ends of the concentric cylinders are generally touched up, which can take place through processing steps such as grinding, turning on a lathe, and so on. The uniform length of the concentric cylinders is of significance for the capacitance of the vacuum capacitor, in order to keep the capacitance value within narrow limits.

Of course, in place of concentric cylinders other geometries for the electrode function can also come into consideration, for example a corrugated-sheet-metal type of geometry, which is distinguished through two steep flanks. Now, it is essential that the flanks of this "corrugated-sheet-metal structure" of a first and second electrode mesh in the assembled state in such a manner that essentially equal gaps result in the entire region of the meshing. So long as the condition of essentially equal gaps remains fulfilled, any geometry whatever can be chosen for the first and second electrodes, while from a production-technology point of view only a small selection of geometries stands out as advantageous.

Materials for electrodes are characterized by an especially good plasticity in the cold state, in other words these materials are suitable for so-called cold-flow extrusion. Suitable as materials for electrodes of this type are materials such as, for example, aluminum, nonferrous metals, precious metals, as well as their alloys; copper is the preferable material, and especially preferable is low-oxygen copper.

A cylindrical workpiece of one of the electrode materials just described is subjected to pressures of ca. 5000 bar in a specially dimensioned tool in cold-flow extrusion, and within a few seconds an extruded part is created that can be removed from the tool. Now, by means of this cold-flow extrusion there results surfaces that are especially advantageous in a surprising manner, which surfaces generally do not require any retouching at all and thus lead to excellent characteristics of the vacuum capacitor, such as the quality factor, for example.

This high surface quality comes about thanks to the extrusion process and yields, through the material compression arising therein, an amazing "finish" at the surface.

Possible further improvements of the surface of the concentric cylinders are brought about, for example, through electropolishing. Especially advantageous improvements include silver plating.

After this formation process there is now available a first electrode, which, produced from one piece, at the same time represents the concentric cylinders, or the electrode part, of the capacitor as well as the capacitor's holder, or fastening part, for these. By this means the difficult and labor-intensive work process for production of the cylinders and the soldering between the cylinders and the holder becomes unnecessary, which not only makes unnecessary a costly assembly step, but also guarantees a surprisingly high dimensional stability.

The second electrode is produced in like manner, the first and second electrodes being laid out structurally in such a manner that in the assembled state, with meshed concentric cylinders, they show a uniform gap between these cylinders. In a further operation the two electrodes are joined to the insulator so as to be vacuum sealed, for which soldering procedures are in general designated.

According to soldering procedure each of the faces of the insulators are provided with a Mo—Mg—Ni layer or else with a surface structure that is suitable for the active soldering process. As material for insulators of this type are such materials as, for example, solderable glass types suitable for high frequencies, as well as industrial ceramics suitable for high frequencies.

This can take place in a vacuum soldering furnace in one operation after which the vacuum capacitor is soldered together, closed up, and made vacuum tight.

It is especially advantageous that the electrodes produced in one piece have proven to be shockproof to a high degree. This is based on the circumstance that the electrode according to the invention performs a double function, namely it forms one "plate", or precisely electrode, of the capacitor and at the same time the holder for this electrode, whereby the problem of forming contact is not applicable in this manner of construction.

The process permits a compact manner of construction, since in a small space a high value of capacitance is achieved. Vacuum capacitors of this design are distinguished by a high quality factor, by a low temperature coefficient, and by a very high current-carrying capacity.

FIG. 4A shows in sectional view one of the two electrodes of the vacuum capacitor, which electrode has already been described with reference to FIG. 2 within the scope of the explanation of the process.

FIG. 4B shows the corresponding plan view with the concentric cylinders 11–15. The boundary 17 represents the first cylindrical part.

Figure 4A:
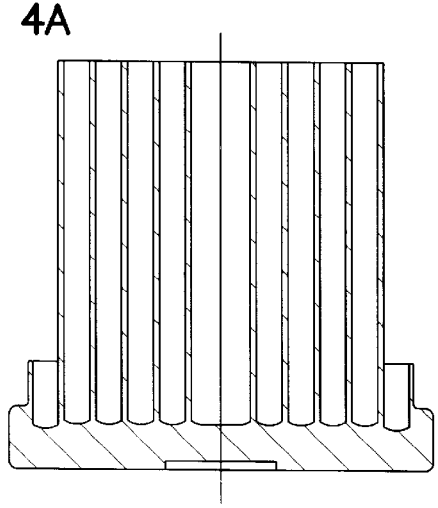
FIG. 4A–4B show a first implementation example of an electrode for a vacuum capacitor of 200 pF with a dielectric strength of 15 kV, in plan and sectional views.
Figure 4B:
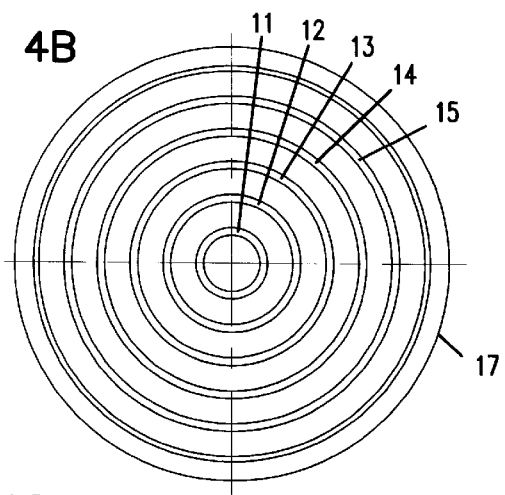
Figure 4C:
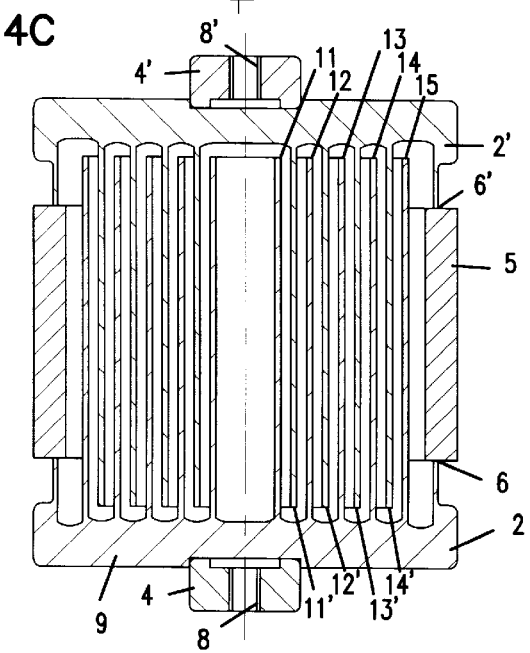

FIG. 4C shows as a first implementation example the same vacuum capacitor in sectional view. The two first cylindrical parts 2, 2' are recognizable, which parts have a diameter of 46 mm and are joined to the insulator 5 in a vacuum-tight manner at locations 6, 6'. The joining comes about in a known way in a vacuum solder furnace. The fastening elements 4, 4' are formed as fastening bolts with threads 8, 8' and permit a screw connection. The concentric cylinders 11–15 and 11'–14' are arranged vertically upon the cylindrical parts 2 and 2' respectively and have been produced in one operation through cold-flow extrusion. The dimensional stability of the gaps of the concentric cylinders 11–15 and 11'–14' is better than 0.05 mm. Low-oxygen copper has been applied as electrode material.

Figure 5A:
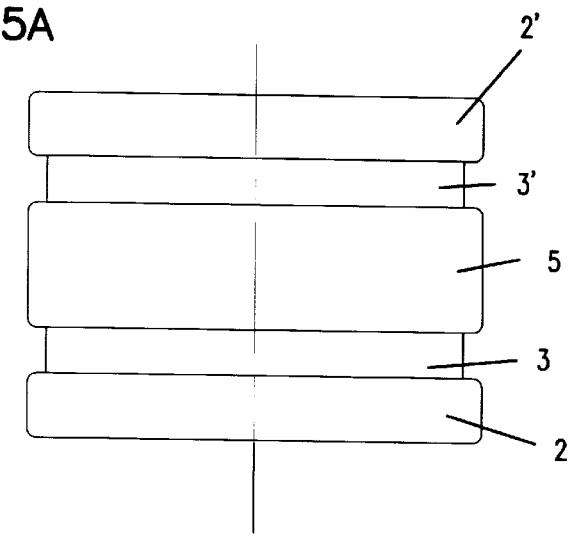

FIG. 5A shows a second implementation example of a vacuum capacitor in outline, for a vacuum capacitor of 50 pF with a dielectric strength of 5 kV. Recognizable are the first cylindrical parts 2, 2', which have a diameter of 35 mm and have been closed up by the insulator 5 in a vacuum-tight manner at locations 6, 6' in a vacuum solder furnace.

Figure 5B:
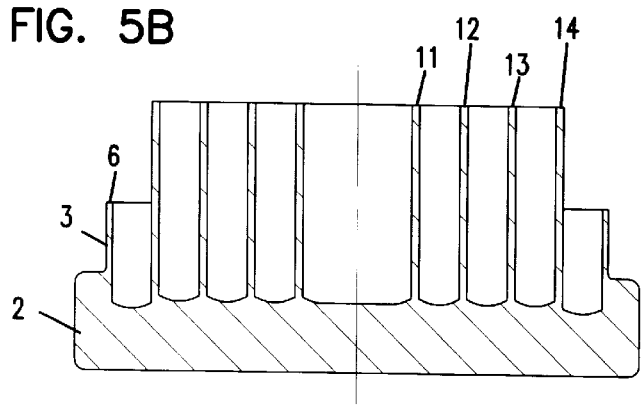
Figure 5C:
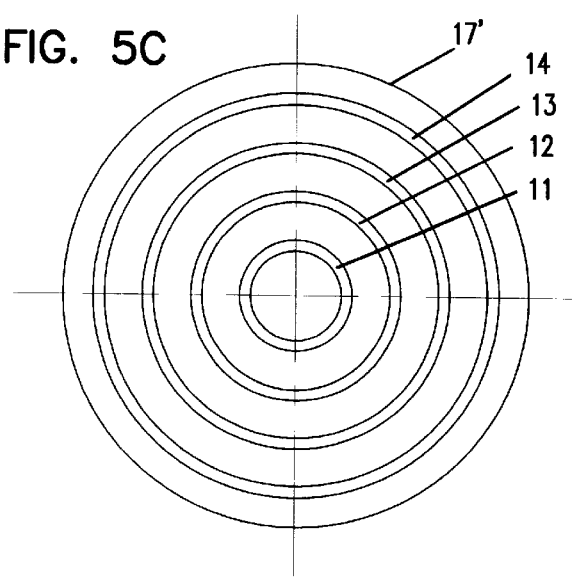

FIG. 5B–5C show the electrode of a second implementation example in plan and sectional views.

Figure 1:
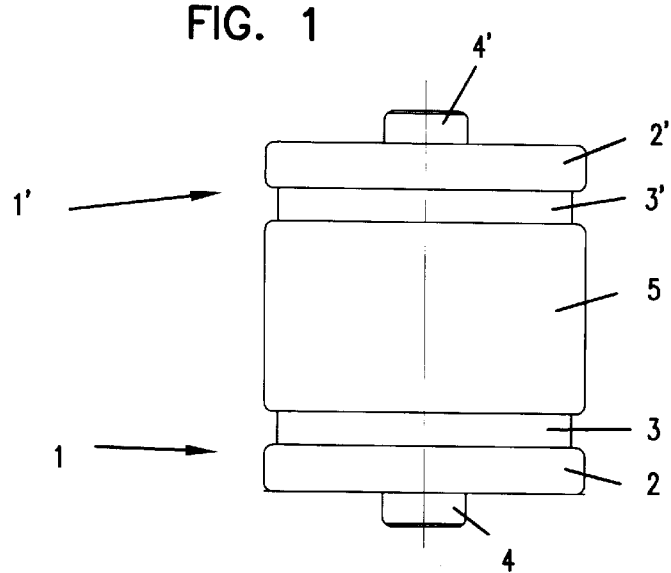
Figure 2:
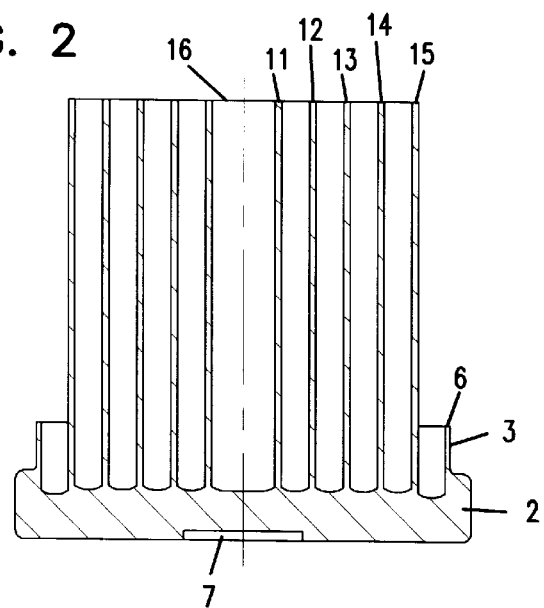
Figure 3:
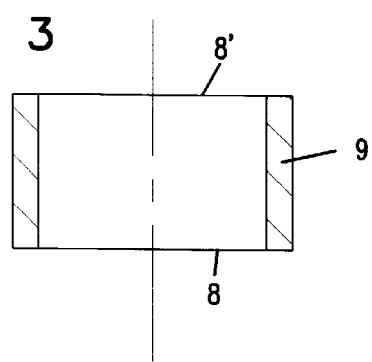
FIG. 3 shows a schematic representation of an insulator in sectional view. This insulator consists, for example, of an industrial ceramic and is here formed as a cylinder 9, which shows polished surfaces on the sides 8, 8'.

FIG. 5B shows in sectional view one of the two electrodes of the vacuum capacitor. It corresponds in essence to that in FIG. 2. It differs in the smaller number of concentric cylinders 11, 12, 13 and 14, as well as in the reduced height of these. Here aluminum is chosen as electrode material, while the insulator consists of a solderable type of glass that is suitable for high frequencies.

FIG. 5C shows the corresponding plan view with the concentric cylinders 11–14. The boundary 17 represents the first cylindrical part.

While in the known constructions the electrode package is generally fastened in a deep cup and the bottom of the cup has been reinforced on the outside with a reinforcement plate, the design according to the invention permits a simple, so-called "THREE-IN-ONE" construction with a single structural component and without a soldering procedure. Further advantages are the simultaneously increased mechanical strength and the improved precision of the plate arrangement, which has a positive effect on the dielectric strength.

Figure 6:
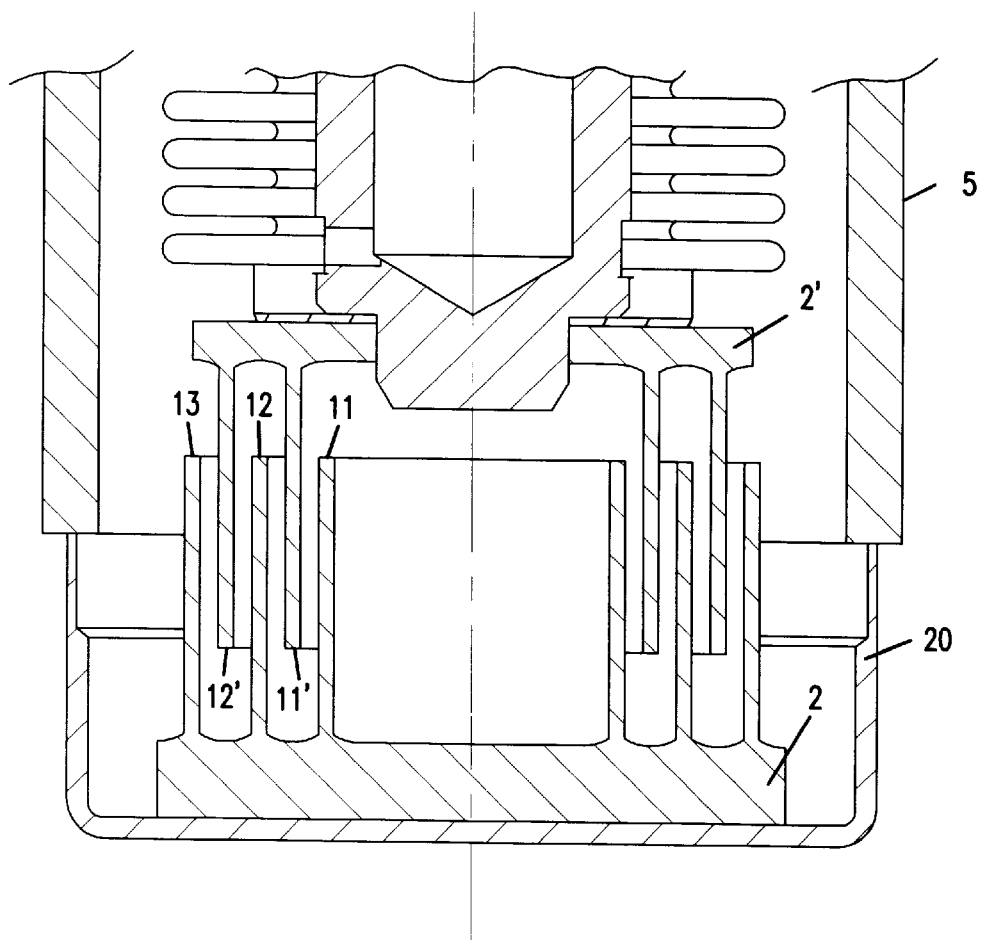

FIG. 6 shows, as a third implementation example, parts of a variable vacuum capacitor in sectional view. Arranged inside a housing part 20 with an adjoining insulator 5, which is only indicated, are a first electrode with first cylindrical part 2 and a second electrode with first cylindrical part 2', the latter being variably adjustable by means of a spindle device, which is represented only by way of indication. The concentric cylinders 11, 12 and 13 of the first electrode are recognizable, as are the concentric cylinders 11' and 12' of the second electrode. Both electrodes are made of copper, but the second electrode, for example, could as well be made of an aluminum alloy; the two electrodes do not need to be made of the same material.

It is fundamental to the invention that the solution of the problem according to the invention is distinguished by a cost-effective and simple assembly-line manufacturing, by a high quality-factor, a low temperature-coefficient, a high current-carrying capacity, and a compact manner of construction with a simultaneous reduction in the number of individual components required.

We claim:

1. A method of producing a capacitor which comprises a first electrode, a second electrode, at least one insulator, and a fastener which fastens the first and second electrodes, the method comprising:

providing a single piece; and extruding the first and second electrodes by a cold-flow extrusion process from the single piece, wherein the first and second electrodes are generated in the single piece having concentric electrode plates arising perpendicular from a mounting plate and having means for fastening the capacitor, and wherein after the cold-flow extrusion process, the first and second electrodes each comprise respective surfaces requiring no retouching.

2. The method of claim 1 further comprising: assembling the first and second electrodes wherein after the cold-flow extrusion process, the first and second electrodes each comprise respective surfaces requiring no retouching, the at least one insulator, and a soldering material in a fixation tool by which an equidistant spacing of the electrodes is achieved;

evacuating and heating the assembly in a vacuum furnace to a temperature below a melting point of the soldering material;

arising the temperature over the melting point of the soldering material to initialize a soldering process;

sealing the capacitor in a vacuum-tight manner; and cooling down the capacitor.

3. The method of claim 2, wherein the assembled capacitor is a vacuum capacitor.

* * * * *